(12) United States Patent
Wolf et al.

(10) Patent No.: US 9,985,424 B2
(45) Date of Patent: May 29, 2018

(54) COMMUNICATION CABLING DUCT HAVING CONTROLLED ELONGATION

(71) Applicant: 3M INNOVATIVE PROPERTIES COMPANY, St. Paul, MN (US)

(72) Inventors: Karl E. Wolf, Round Rock, TX (US); John P. Lammers, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 93 days.

(21) Appl. No.: 15/120,759

(22) PCT Filed: Feb. 24, 2015

(86) PCT No.: PCT/US2015/017209
§ 371 (c)(1),
(2) Date: Aug. 23, 2016

(87) PCT Pub. No.: WO2015/142483
PCT Pub. Date: Sep. 24, 2015

(65) Prior Publication Data
US 2016/0380419 A1    Dec. 29, 2016

Related U.S. Application Data

(60) Provisional application No. 61/968,566, filed on Mar. 21, 2014.

(51) Int. Cl.
*H02G 3/30* (2006.01)
*H02G 3/04* (2006.01)
*G02B 6/44* (2006.01)

(52) U.S. Cl.
CPC .......... *H02G 3/305* (2013.01); *G02B 6/4459* (2013.01); *H02G 3/0481* (2013.01)

(58) Field of Classification Search
CPC ........ H02G 3/0481; H02G 3/305; H02G 3/04; H02G 3/266; G02B 6/4459
See application file for complete search history.

(56) References Cited

U.S. PATENT DOCUMENTS 4,241,979 A    12/1980 Gagen et al.
5,202,942 A    4/1993 Collins et al.
(Continued)

FOREIGN PATENT DOCUMENTS

| JP | 59-031902 | 2/1984 |
| JP | 2009-288382 | 12/2009 |
| JP | 2009-296804 | 12/2009 |

OTHER PUBLICATIONS

International Search report for PCT International Application No. PCT/US2015/017209 dated May 28, 2015, 3 pages.

*Primary Examiner* — Thomas A Hollweg
*Assistant Examiner* — Mary A El Shammaa
(74) *Attorney, Agent, or Firm* — Janet Kling

(57) ABSTRACT

According to exemplary embodiments of the present invention, an adhesive-backed duct having controlled elongation properties is described. The adhesive backed duct has a main body having a conduit portion with a cavity formed longitudinally therethrough, a flange portion having an adhesive backing layer disposed thereon to mount the duct to a mounting surface, and at least one rod-like strength member disposed within and extending longitudinally with the main body of the duct. The at least one rod-like strength member is comprised of a plurality of aligned segments.

15 Claims, 11 Drawing Sheets

(56) References Cited

U.S. PATENT DOCUMENTS

| | | |
|---|---|---|
| 5,408,561 A | 4/1995 | McCallum, III et al. |
| 5,702,994 A | 12/1997 | Klosel |
| 6,862,390 B2 | 3/2005 | Tanaka et al. |
| 2011/0030832 A1* | 2/2011 | Larson ................. G02B 6/4441 138/137 |
| 2013/0025929 A1 | 1/2013 | Dower et al. |
| 2013/0098674 A1* | 4/2013 | Shoemaker .......... H01Q 13/203 174/480 |
| 2014/0060883 A1* | 3/2014 | LeBlanc ............. H02G 3/0481 174/95 |

\* cited by examiner

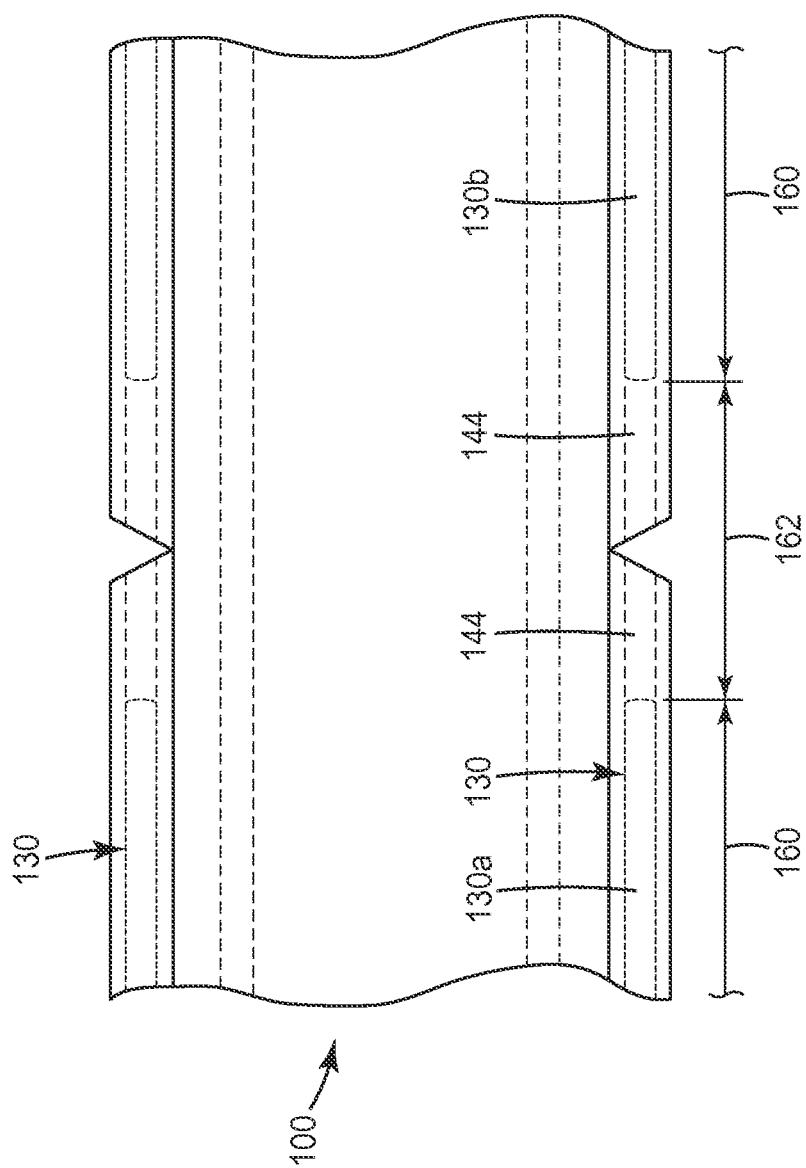

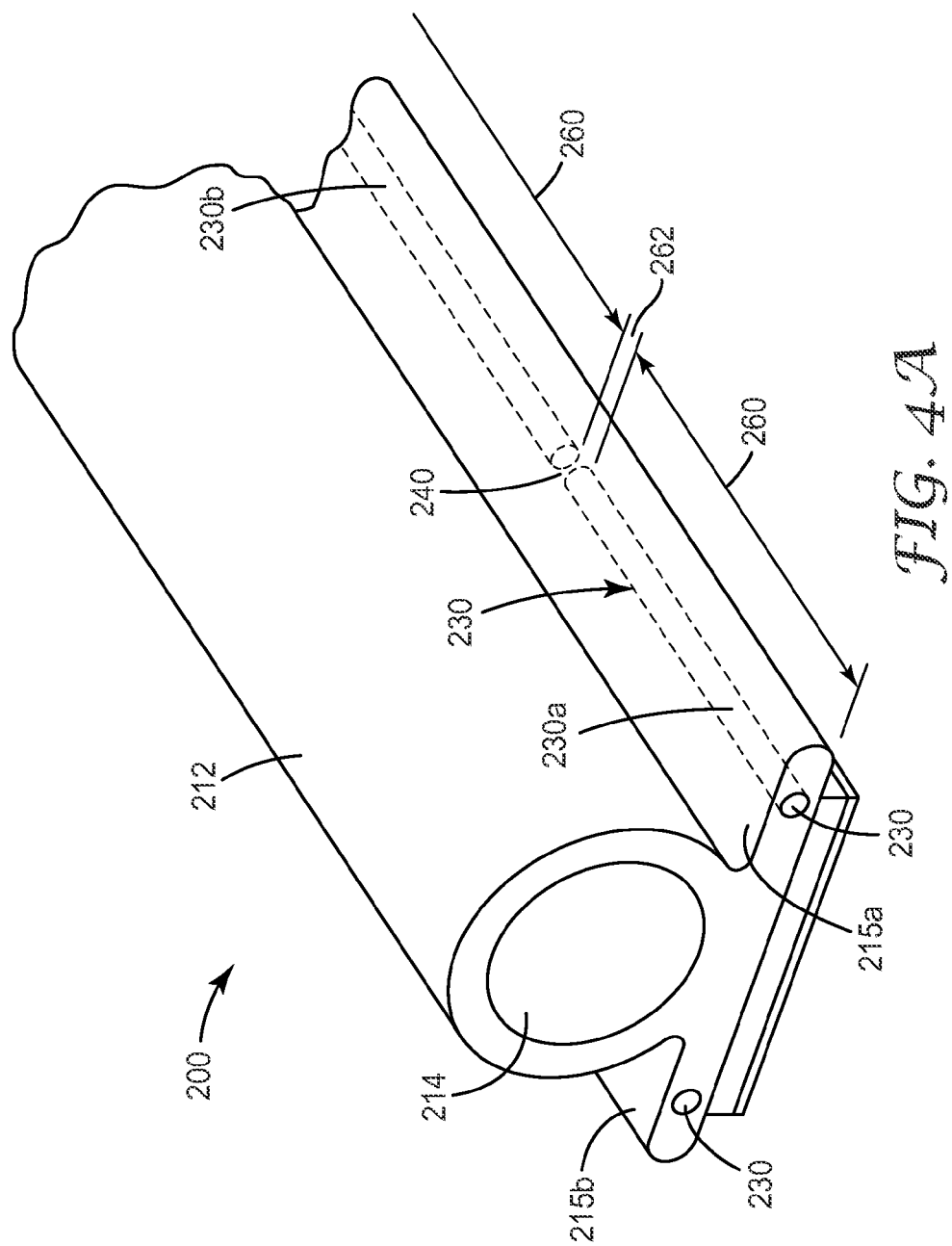

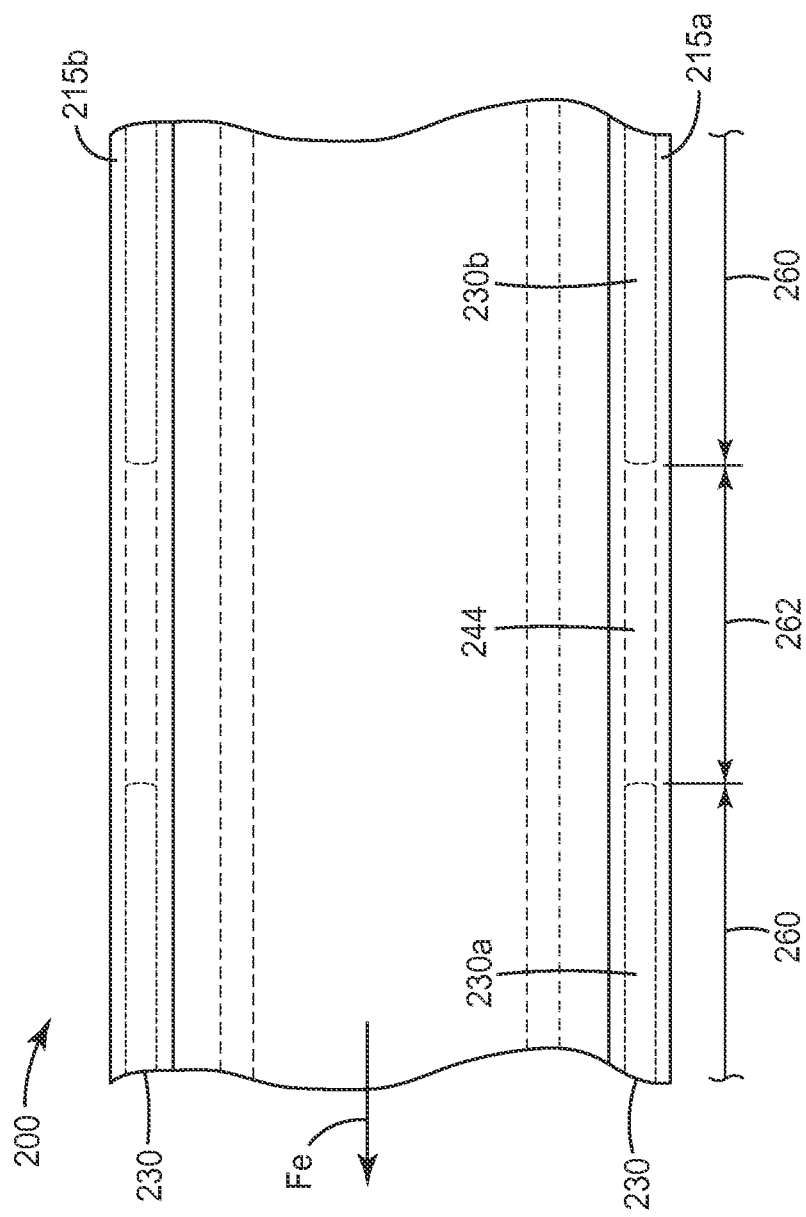

COMMUNICATION CABLING DUCT HAVING CONTROLLED ELONGATION

BACKGROUND OF THE INVENTION

Field of the Invention

The present invention is directed to adhesive-backed communication cabling duct cabling for in-building wireless or fiber to the home horizontal cabling applications. In particular, the elongation properties of the exemplary duct are controlled by introducing an array of defined discontinuities along the length of the cabling duct.

Background

More than half of all mobile communications originate from inside buildings. With the development of 3G and 4G smart phones and other data intensive mobile devices, increasing demand is being placed on wireless and wired infrastructure within buildings such as office buildings, schools, hospitals, and residential units. Better wired and wireless communication coverage is needed to provide the desired bandwidth to an increasing number of customers. However, the labor to install these enhanced wired and wireless systems in existing buildings can be costly, so a low cost and easy to install structured cabling solution to enhance wired and/or wireless coverage within a building is needed.

Conventional wired communications systems include enterprise grade Passive Optical Networks (PONs) and Ethernet over twisted pairs or optical fibers. Wired cabling can also be used for remote powering of optical fiber fed wireless access points and remote radios for the in building wireless system. Telecommunication carriers are extending higher capacity wired and wireless coverage inside buildings. There are a number of known network architectures for distributing communication signals inside of a building. These architectures include choices of passive, active and hybrid systems. Active architectures generally include manipulated transmission signals carried over fiber optic cables to remote electronic devices which reconstitute the electrical signal and transmit/receive the signal. Passive architectures include components to radiate and receive signals. Hybrid architectures can include an optical or RF signal carried optically to active signal distribution points which convert the signal into another form which is transmitted to an appropriate receiving device.

Physical and aesthetic challenges exist in providing high bandwidth cabling for different communication network architectures, especially in older buildings and structures. These challenges include gaining building access, limited distribution space in riser closets, and space for cable routing and management. Conventional methods for routing of cables in these communication networks can include direct application of cabling to a wall or ceiling surface which can be aesthetically unpleasing, placement of the cabling within rigid duct work or behind decorative moldings which can be expensive and labor intensive to install, and placement of the cabling within elastomeric ductwork. Elastomeric ductwork can be pre-populated with transmission media including power lines or communication lines such as optical fibers and metallic communication lines (i.e. twisted pair copper wires, micro coaxial cable, etc). Using elastomeric duct work can be advantageous because it is provided in long continuous lengths on transportation spools. However, the spooling of the duct on the transportation spool can lead to an extra amount (i.e. length) of transmission media being pulled into a loosely filled duct. When the duct is removed from the reel and installed on a wall, excess media in the duct may have nowhere to travel; thus the media can bend and/or buckle inside the duct. The bending and buckling of the transmission media inside the duct can damage the media and/or degrade the signal performance being transmitted through the media. Ducts with inadequate elongation properties can be susceptible to this type of problem, if the media and strength member are not in the same bending plane or neutral axis. Thus, there is a need for a continuous elastomeric duct having controlled elongation properties.

SUMMARY

According to exemplary embodiments of the present invention, an adhesive-backed duct having controlled elongation properties is described. The adhesive backed duct has a main body having a conduit portion with a cavity formed longitudinally therethrough, a flange portion having an adhesive backing layer disposed thereon to mount the duct to a mounting surface, and at least one rod-like strength member disposed within and extending longitudinally with the main body of the duct. The at least one rod-like strength member is comprised of a plurality of aligned segments.

In an exemplary aspect, the at least one rod-like strength member has a discontinuity between each of the adjacent aligned segments. The exemplary duct comprises a plurality of discontinuities between adjacent aligned segments at regular intervals disposed longitudinally along the length of the continuous main body. In another exemplary aspect, the aligned segments and the discontinuities between adjacent aligned segments of the rod-like strength members create non-elongation zones and elongation zones within the duct, wherein the non-elongation zones are defined as regions of the duct having the aligned segments of the rod-like strength members and the elongation zones can be defined as regions in the duct that are proximate to the discontinuities between adjacent segments of the strength member.

In an alternative embodiment, an adhesive-backed duct having controlled elongation properties has a continuous main body having a conduit portion with a cavity formed longitudinally therethrough; transmission media disposed within the cavity of the conduit portion, and alternating elongation zones and non-elongation zones disposed longitudinally along the duct. The adhesive backed duct also has at least one rod-like strength member disposed within and extending longitudinally with the main body of the duct, wherein the at least one rod-like strength member is comprised of a plurality of aligned segments alternating with a plurality of discontinuities between adjacent aligned segments. The non-elongation zones are defined as regions of the duct having the aligned segments of the rod-like strength members and the elongation zones can be defined as regions in the duct that are proximate to the discontinuities between aligned segments of the at least one strength member.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 3A-3C are three views of a first exemplary adhesive-backed duct in accordance with an aspect of the present invention;

FIGS. 4A-4B are two views of a second exemplary adhesive-backed duct in accordance with an aspect of the present invention;

Figure 1:
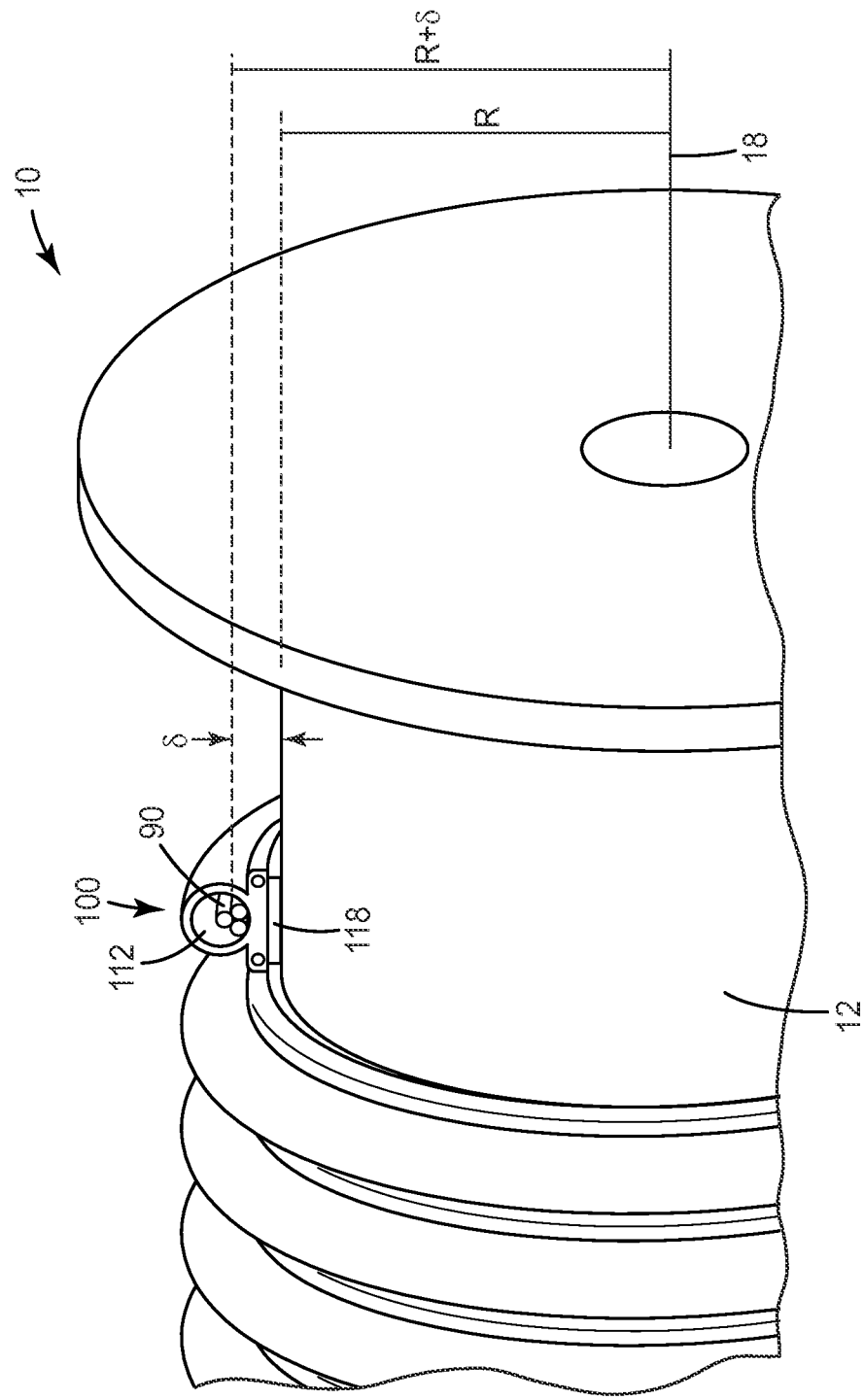
FIG. 1 is a partial isometric view of an exemplary adhesive backed duct disposed on a transportation spool.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an adhesive-backed elastomeric duct for distributing transmission media which can include one or more electrical or optical communication lines and/or one or more power lines for communication and wiring applications in a premise or building, such as a MDU (which for purposes of this application can include a typical multi dwelling unit, multiple tenant unit (MTU), office building, school, hotel, hospital or other location) or another facility. The exemplary duct includes a main body having a conduit portion and a flange structure disposed beneath the conduit portion, at least one discontinuous strength member disposed within the main body and an adhesive layer disposed on a bottom surface of the flange structure which allows an installer or the service provider to mount the duct to a mounting surface, such as a wall, in a straightforward manner. The discontinuous strength member controls the elongation of the duct to minimized effects due to storage of excess transmission media while ensuring robust adhesion to the mounting surface on which it has been mounted.

The size of the exemplary duct is minimized in order reduce its visibility and increase the aesthetics of the duct when it is attached to a mounting surface. Even in ducts that are not fully populated, the exemplary duct can accommodate less the 0.5% excess fiber length within the duct. In a preferred aspect, the exemplary duct can accommodate less the 0.3% excess fiber length within the duct. In another preferred aspect, the exemplary duct can accommodate less the 0.1% excess fiber length within the duct.

FIG. 1 shows a portion of a spool 10 having an exemplary duct 100 wrapped around the drum portion 12 of the spool, wherein the drum portion characterized by a radius, R, measured from the central axis 18 of the spool. The figure shows how the transmission media 90 are displaced from the surface of the spool's drum portion by a separation distance, $\delta$, which is equivalent to the thickness of the adhesive layer 118 with a liner (not shown in the figure) plus the distance from the bottom side of the duct's flange to the center point of the transmission media residing in the bore of the conduit portion 112 of the duct. The excess media contained within the first layer of duct wrapped on the spool having a drum portion characterized by a radius R measured from the central axis of the spool can be expressed as a ratio of the difference between the location of media (R+$\delta$).

Figure 2:
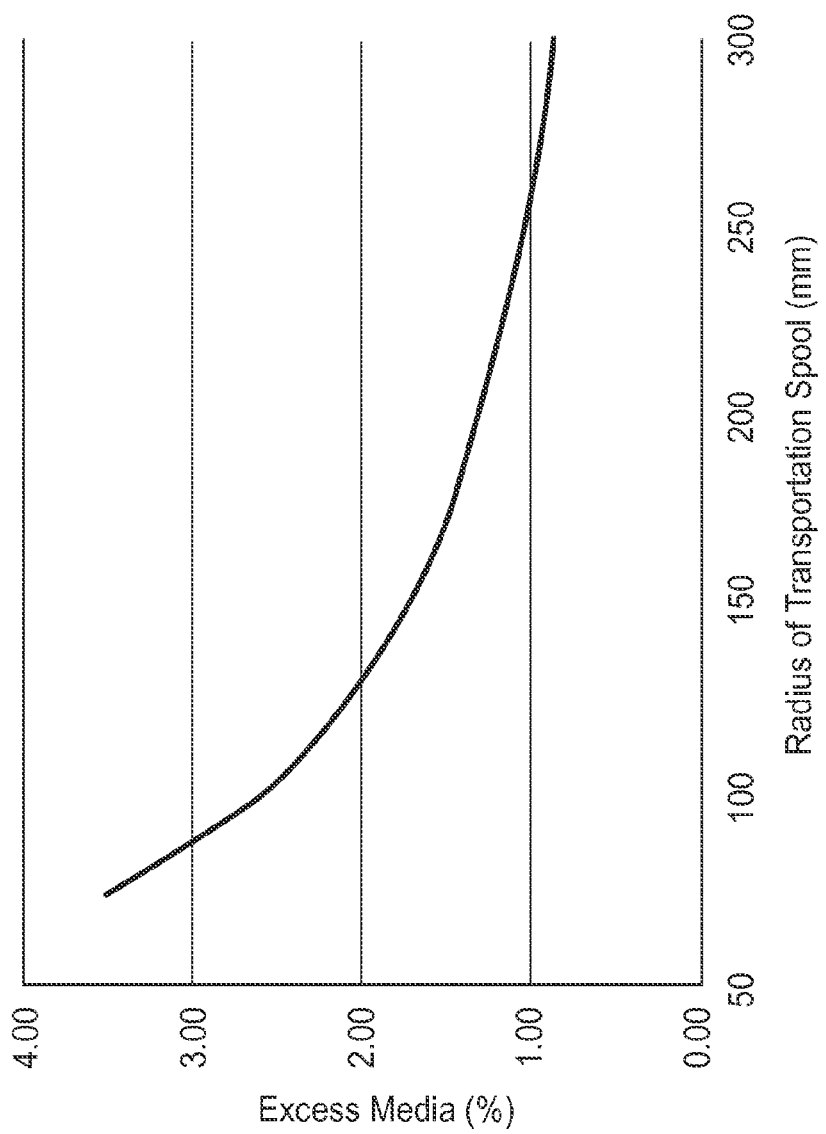
FIG. 2 is a graph showing the excess media in a duct due to wrapping it on a transportation spool.

Percentage of extra media contained within the first wrapped layer can be expressed as a simple ratio difference between the perimeter defined by the transmission media and the perimeter of the spool divided by the perimeter of the spool. Simplifying this relationship shows that the percent of excess media in the duct is proportional to the separation distance divided by the radius of the drum portion ($\delta$/R). FIG. 2 graphically illustrates this relationship of a duct where the separation disk is 0.105 in over a range of drum portion radii. FIG. 2 shows that an exemplary duct cannot accommodate the excess media within the duct even for spools that have a radius of 12 in. In addition, the desire to minimize transportation costs would drive the selection of the smallest spool which could hold the desired length of duct, but smaller spools lead to more excess media in the duct.

When a duct with inadequate elongation properties is removed from the reel and installed on a wall, excess media in the duct may have nowhere to travel; thus the media can bend and/or buckle inside the duct. The bending and buckling of the transmission media inside the duct can damage the media and/or degrade the signal performance being transmitted through the media. Thus, continuous ductwork should stretch by a sufficient amount to provide space for the excess media.

However, maintaining robust adhesion to the mounting surface requires that an exemplary duct not stretch or elongate to such an extent during installation that stress relaxation and creep of the duct as it attempts to restore itself to its original length does not cause the adhesive backed duct to separate from the mounting surface. On the other hand, the duct needs to have a suitable amount of elongation to account for the excess transmission media in the duct spooling and to allow the duct to react to local environmental changes. The coefficient of thermal expansion (CTE) of unconstrained elastomer duct (i.e. ducts with no internal strength members) may be sufficiently high to cause gapping between the wall and the duct. On the other hand, highly constrained ducts having continuous glass reinforced polymer (GRP) strength members disposed within the duct structure may not be able to mirror the expansion and contractions of the mounting surface due to thermal excursions, humidity or other environmental conditions. The CTE difference between the duct with continuous GRP strength members and the wall can create buckled areas in the duct that push the adhesive and the duct loose from the wall. Thus, there is a need for an adhesive backed duct having a controlled and defined elongation profile.

The exemplary duct, described herein, includes discrete elongation zones and discrete non-elongation zones to provide a duct with a controlled amount of elongation. The elongation zones enable the exemplary duct to accommodate the excess transmission media present in the duct due to spooling without binding the transmission media when the duct passes around or through a corner, as well as providing sufficient flexibility and elongation to a accommodate changes in the local environment around the duct. The non-elongation zones provide stable anchoring of the exemplary ducts to a mounting surface.

The exemplary ducts described herein can be used to provide transmission media that can be used to connect with telecommunication drop lines from individual living units, such as residences, classrooms, or offices, within the MDU or other building and/or to provide a final drop within the living unit in an MDU or other building. The ducts described herein have a low impact profile for better aesthetics. For example, the ducts can be installed on the walls of a corridor or hallway in an existing building to provide new communications wiring to individual residences and offices and/or within the individual residences and offices. The term "living unit" is not limited to a domicile or residence, but can include an office, conference room, hotel room, hospital room, school room or other similar room, whether or not continuously occupied.

The present invention is directed to a duct for in-building wireless and wireline applications that enables inventive telecommunication cabling solutions within structures, i.e. homes, office buildings, educational institutions, stadiums, hospitals, etc. The exemplary duct, described herein, includes at least one embedded, segmented strength member running parallel to the longitudinal axis of a highly flexible elastomeric duct. The exemplary duct can be configured to carry a variety of transmission media such as twisted pair copper wires, coaxial (coax) cables, twin axial (twinax) cables, optical fibers, and power distribution cabling. The low impact profile of the exemplary duct enables designing of cabling solutions and systems having better aesthetics and providing multiple channels of RF/cellular or data traffic to be distributed within a building, structure, or premises location.

These multiple signal pathways can be dedicated to different carriers, with each carrier needing distribution pathways within a building, or to providing different services such as wireless services and wired data transmission. These multiple signal pathways can also be dedicated to routing signals to different locations within a building. The exemplary ducts may be used above the ceiling or below the ceiling enabling flexible network design and optimization for a given structure or indoor environment.

The exemplary duct can be designed to accommodate most small forms of transmission media, such as small optical fiber or electrical cables. For example, exemplary duct can be sized to accommodate one or more of a copper ribbon cable, a fiber ribbon cable, a twin ax cable, a micro-coax cable, a twisted pair cable such as a CAT 5e cable or a CAT 6 cable, a coated wire, an optical fiber drop cable or a 900 micron coated optical fiber.

Figure 3A:
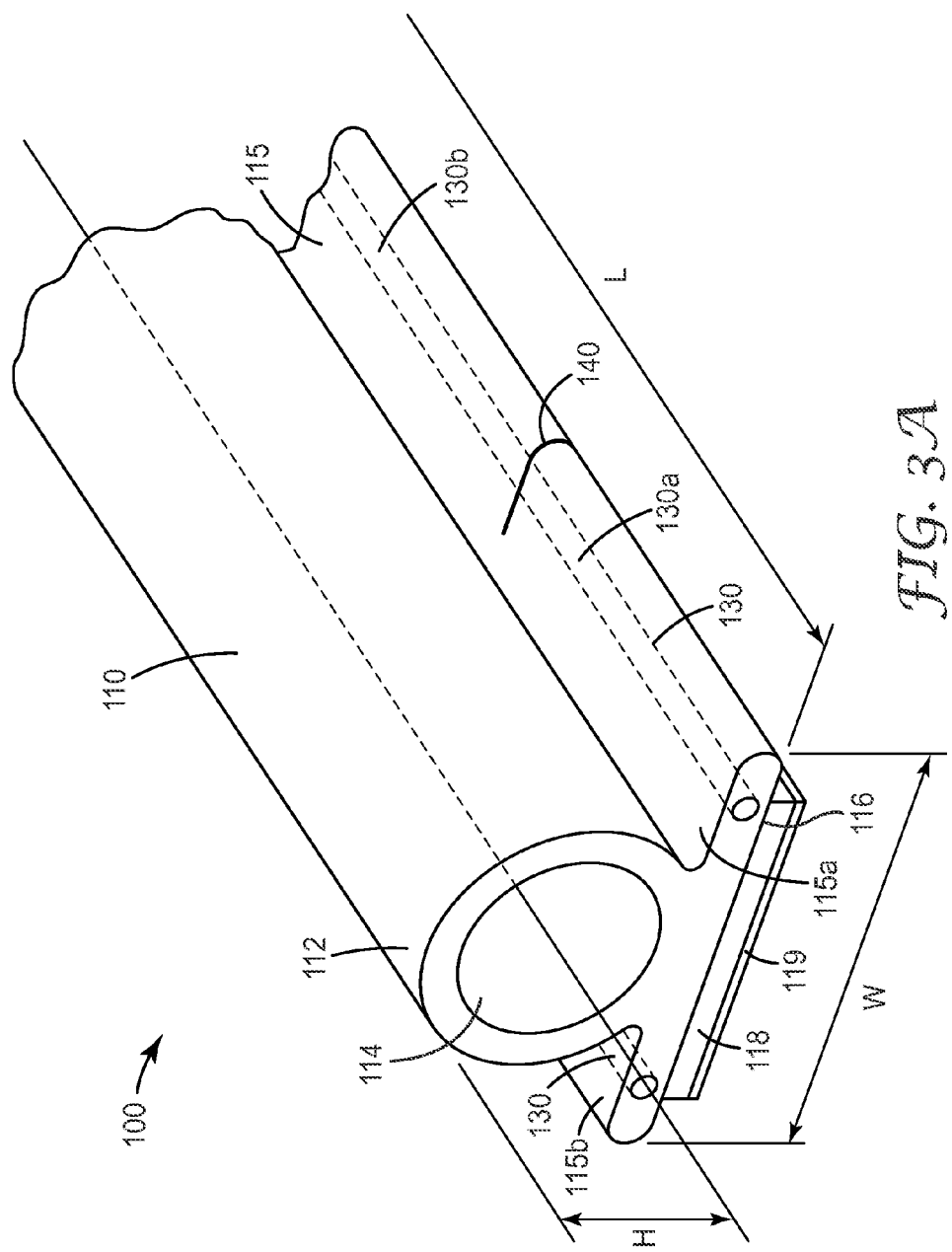

In a first aspect of the invention, an adhesive-backed cabling duct accommodates one or more transmission signal channels to provide horizontal cabling for In Building Wireless (IBW) applications or optical fibers to support a fiber to the home network. As shown in FIG. 3A, duct 100 includes a main body 110 having a conduit portion 112 with a bore or cavity 114 provided therethrough. The cavity extends longitudinally through the main body and defines the longitudinal axis of the exemplary duct. The cavity is sized to accommodate transmission media (not shown) in the form of one or more communications lines and/or power conductors disposed therein. In a preferred aspect, in use, the duct 100 comprises one or more communications lines, such as optical fibers, twisted pair copper wires or micro coaxial cable. In use, the duct 100 can be pre-populated with one or more communications lines. While conduit portion 112 of duct 100 can have a generally circular cross-section as shown in FIG. 3A, alternative embodiments can have other shapes, such as a rectangle, square, triangle, oval, or other polygonal shaped cross-section. In some embodiments, the cavity can be divided into multiple sections to separate carriers or media type within a single duct structure.

Figure 3B:
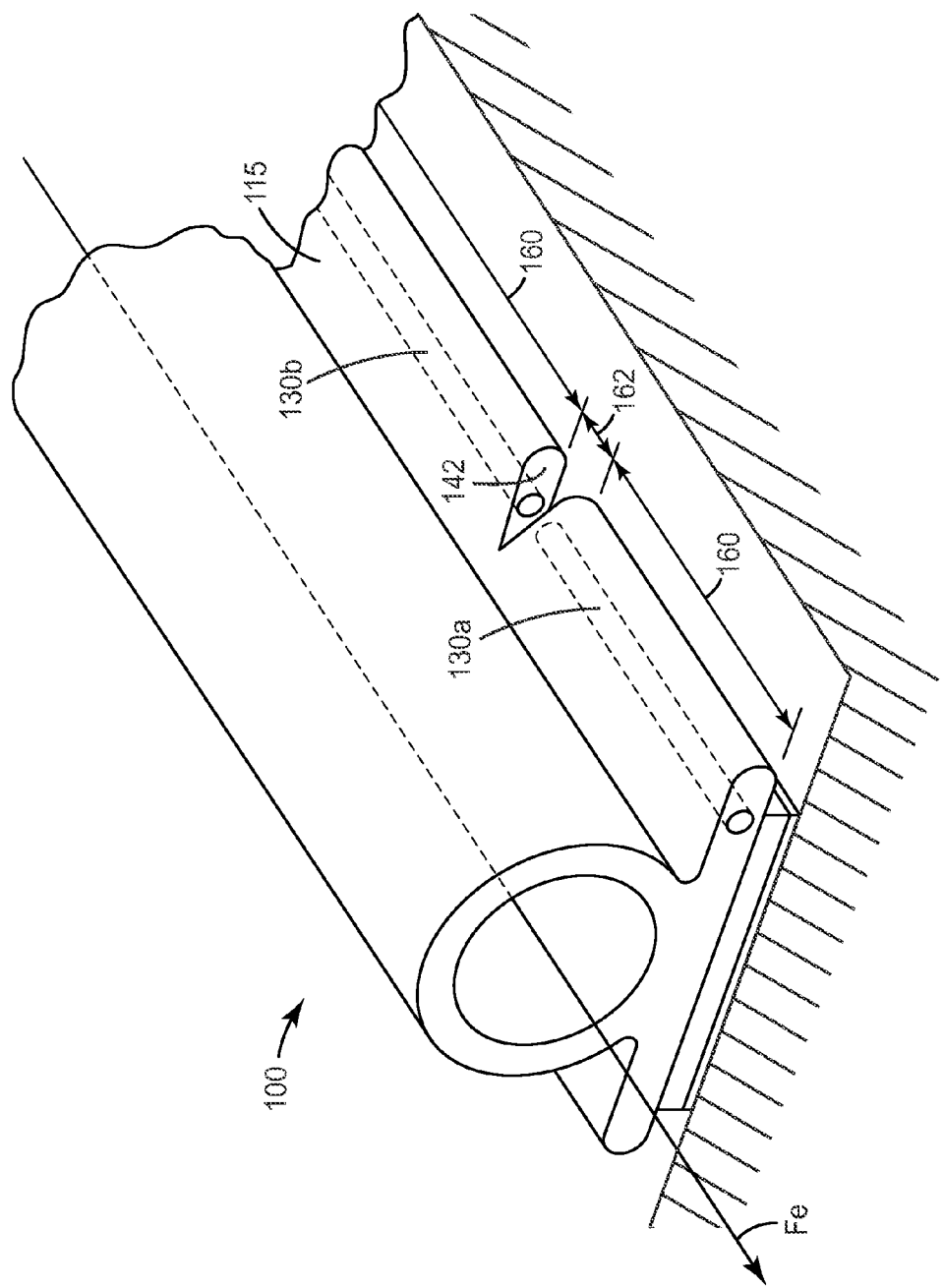

The duct 100, shown in FIGS. 3A-3C, is an elongated, substantially continuous structure having a length, L, that is significantly longer than any other primary dimension of the duct (e.g. the height, H, of the duct and the width, W, of the duct). For example, the width of the duct can be from about 5 mm to about 50 mm. Thus, in a preferred aspect, the duct can have a shape or form factor (L vs. W) of at least an order of magnitude, and in many applications, the duct can have a form factor of at least about 25 to 1, a form factor of at least about 50 to 1, or a form factor of at least 100 to 1. The exemplary duct described herein can be supplied to the installer in mass spooled form having tens of meters or hundreds of meters of duct on a single spool. The length of the duct disposed on a transportation spool is limited only by logistical constraints.

Duct 100 also includes a flange 115 or similar flattened portion disposed beneath conduit portion 112. The flange provides support for the duct as it is installed on or mounted to a wall or other mounting surface, such as a floor, ceiling, or molding. In most applications, the mounting surface is generally flat. The mounting surface may have texture or other structures formed thereon. In other applications, the mounting surface may have curvature, such as found with a pillar or column. The flange extends along the longitudinal axis of the duct as shown in FIG. 3A. Exemplary duct 100 includes a double flange structure, with flange portions 115a and 115b, positioned below the centrally positioned conduit portion. In an alternative aspect, the flange can include a single flange portion.

In a preferred aspect, the flange 115a, 115b includes a rear or bottom surface 116 that has a generally flat surface shape. This flat surface provides a suitable surface area for adhering the duct 100 to a mounting surface, a wall or other surface (e.g., dry wall or other conventional building material) using an adhesive layer 118.

Duct 100 further includes at least one discontinuous strength member 130, such as an aramid string, thread or yarn (e.g., a woven or non-woven Kevlar material), a metallic wire, or a glass or fiber reinforce polymer rod. In the exemplary aspect shown in FIGS. 3A-3C, the duct has two strength members, one embedded within each of the flanges 115a, 115b.

Some conventional ducts have continuous strength members to prevent any elongation/relaxation of the duct to prevent debondment of the duct from the mounting surface over time as it relaxes from an elongated state due to stretching of the duct that may have occurred during spooling of during installation onto the mounting surface. Care must be taken with these ducts to minimize the effects or excess media resulting from the spooling of the duct during manufacture of the duct. Thus, an elastomeric duct that has controlled elongation properties will provide advantages in spooling and application over these conventional ducts having continuous strength members.

In order to control the elongation properties of the duct 100, each discontinuous strength member 130 is made up of a plurality of aligned segments disposed parallel to the longitudinal axis of the duct such that there is a discontinuity 140 between adjacent segments 130a, 130b of the strength member 130. In an exemplary aspect, the head end of one of the aligned segments is disposed adjacent or proximate to the tail end of another segment. Thus, the aligned segments can be disposed in a head-to-tail arrangement forming the discontinuous strength member. In an exemplary aspect, the discontinuity between adjacent segments of the at least one strength member can be disposed at regular intervals along the length of the exemplary duct. In an exemplary duct having more than one strength member, the discontinuities between adjacent segments can occur at the same position along the longitudinal length of the duct. The width of the discontinuities as well as the distance between adjacent discontinuities determines the segmental elongation of the exemplary duct.

In an exemplary aspect, discontinuous strength member 130 is formed from a rod-like strength member such as a glass reinforced polymer (GRP) rod or a fiber reinforced polymer (FRP) rod. These rod-like strength members have a cylindrical profile that is characterized by the strength member's cross-sectional diameter. Exemplary rod-like strength member which can be used to form the exemplary duct can have a diameter from about 0.25 mm to about 1.0 mm, preferentially from about 0.3 mm to about 0.75 mm. The diameter of the rod-like strength member will affect the final geometry of the duct because it can be preferable to have a thickness equivalent to at least about one diameter of the resin material used to make the duct surrounding the rod-like strength member in the final duct construction. So for example, a 0.25 mm rod-like strength member would have at least 0.25 mm of polymer surrounding the rod-like strength member on all sides of the rod, although a thicker layer of resin may be used. The rod-like strength members were used as provided although applying a surface treatment such as roughening the surface of the rods with an abrasive may enhance the bonding between the FRP strength member rods and the resin material.

In the exemplary aspect shown in FIGS. 3A-3C, exemplary duct 100 may have been formed by feeding two continuous strength members into the extruder used to form the duct, such that the two strength members are embedded in the elastomeric polymer material used to form main body of the duct. Specifically, the continuous strength member is disposed in each of the flanges 115a, 115b. Discontinuities can be added at regular intervals along the length of the duct after the formation of the duct and prior to spooling by slitting or cutting through the flange perpendicular to the longitudinal axis the duct. For example, the discontinuity 140 can be in the form of a slit that cuts through the section of flange portions 115a, 115b that includes the continuous strength member such that the continuous strength member is cut through creating the discontinuous strength member 130. The discontinuous strength member sequentially aligned segments such as segments 130a, 130b as shown in FIG. 3A. While the discontinuity between adjacent segments 130a, 130b is shown as a slit in the figure, the discontinuity can also be created by forming a rectangular or v-shaped notch that extends through the flange cutting through the strength member at regular intervals along the longitudinal axis of the duct.

Providing discontinuities between adjacent segments in the strength members embedded in the duct can create non-elongation zones 160 and elongation zones 162 as shown in FIG. 3B. The non-elongation zones can be defined as the regions of the duct having the continuous segments of the strength members and the elongation zones can be defined as the regions in the duct that are proximate to the discontinuities between adjacent segments of the strength member as shown in FIG. 3B. This figure shows a portion of duct 100 that has been subjected to a longitudinal extension force (as indicated by extension force arrow Fe in the figure) causing a lengthening of the elongation zone 162 resulting in the opening of the slit 140 in FIG. 3A into a V-shaped separation 142 (shown in FIG. 3B) between adjacent end of segments 130a, 130b of the strength member. At moderate extension forces, the discontinuities will open along the length of the duct. When the duct relaxes, the discontinuities may close returning the duct to its original or non-extended state.

The discrete elongation zones and discrete non-elongation zones enable the formation of an exemplary duct having controlled elongation properties. In an exemplary aspect, the elongation zones and the non-elongation zones are disposed in an alternating arrangement longitudinally along the length of the duct. The elongation zones enable the exemplary duct to accommodate the excess transmission media present in the duct due to spooling without binding the transmission media when the duct passes around or through a corner, as well as providing sufficient flexibility and elongation to accommodate changes in the local environment around the duct (i.e. allowing it to match the thermal expansion of the mounting surface to which it is attached). The non-elongation zones provide a stable region for anchoring of the exemplary ducts to a mounting surface because the non elongation zones are not subject to creep which could cause debondment of the adhesive from the mounting surface to which the duct is attached.

In an exemplary aspect, the non-elongation zones account for up to 97% of the length of the duct and the elongation zones account for less that 3% of the length of the duct. In an exemplary aspect, the non-elongation zones account for up to 98% of the length of the duct and the elongation zones account for less that 2% of the length of the duct.

FIG. 3C shows a top view of a duct 100 that has been subjected to a larger extension force than the duct 100 in FIG. 3B. This larger extension force can be the extension force applied to the entire length of the duct, in which case the retraction of the segments would be seen at all or at a substantial number of the discontinuities along the length of the duct, or it can be a local extension force due to a snag in the takeoff reel which may affect only a single or small number of strength member segments along a discrete length of the duct. In this case, the ends of the segments 130a, 130b of strength members 130 can be retracted into the flanges 115a, 115b be of the duct leaving a hollow channel 144 where the ends of the strength member segments would have resided when the duct was in a non-extended or moderately extended state. In this aspect of the invention, the elongation zone is larger than in the instance when a more moderate extension force is applied.

Duct 100 also includes a flange or similar flattened portion to provide support for the duct 100 as it is installed on or mounted to a wall or other mounting surface, such as a floor, ceiling, or molding. In most applications, the mounting surface is generally flat. The mounting surface may have texture or other structures formed thereon. In other applications, the mounting surface may have curvature, such as found with a pillar or column. The flange extends along the longitudinal axis of the duct as shown in FIG. 3A. Exemplary duct 100 includes a double flange structure, with flange portions 115*a* and 115*b*, positioned below the centrally positioned conduit portion as shown in FIGS. 3A and 3B. In an alternative aspect, the flange can include a single flange portion. In alternative applications, a portion of the flange can be removed for in-plane and out-of-plane bending.

In a preferred aspect, the flange portions 115*a*, 115*b* includes a rear or bottom surface 116 that has a generally flat surface shape. This flat surface provides a suitable surface area for adhering the duct 100 to a mounting surface, a wall or other surface (e.g., dry wall or other conventional building material) using an adhesive layer 118. In a preferred aspect of the present invention, the adhesive layer 118 comprises an adhesive, such as an epoxy, transfer adhesive, acrylic adhesive or double-sided tape, disposed on all or at least part of surface 116. In one aspect, adhesive layer 118 comprises a factory applied 3M VHB 4941F adhesive tape (available from 3M Company, St. Paul Minn.). In another aspect, adhesive layer 118 comprises a removable adhesive, such as a stretch release adhesive. By "removable adhesive" it is meant that the duct 100 can be mounted to a mounting surface (preferably, a generally flat surface, although some surface texture and/or curvature are contemplated) so that the duct 100 remains in its mounted state until acted upon by an installer/user to remove the duct from its mounted position. Even though the duct is removable, the adhesive is suitable for those applications where the user intends for the duct to remain in place for an extended period of time. Suitable removable adhesives are described in more detail in U.S. Pat. Publication No. 2013-0025929, incorporated by reference herein in its entirety.

In an alternative aspect, adhesive layer 118 includes a removable liner 119. In use, the liner 119 can be removed and the adhesive layer can be applied to a mounting surface.

Moreover, the ducts described herein may be coextruded with at least two materials. A first material can exhibit properties that afford protection of the communication lines or other cables within the conduit portion of each duct such as against accidental damage due to impact, compression, or even provide some protection against intentional misuse such as stapling. A second material can provide functional flexibility for cornering.

In some aspects, the ducts can include a V0 flame retardant material, can be formed from a material that is paintable, or in a further alternative, can be covered with another decorative material.

In a preferred aspect, adhesive backed duct 100 can be extruded around the communication lines (coax cables, twisted pair copper wires, optical fibers, and/or power lines) to be contained therein.

An omega shaped duct having an outside diameter of about 23 mm was formed by co-extruding an APEX flexible extrusion grade PVC resin available from Teknor Apex Company (Jamestown, N.C.) around two continuous 0.45 mm diameter FRP strength member rods available from Fiber-Line, Inc. (Hatfield, Pa.) and a grouping of transmission media. The FRP Strength member rods were passed through the extrusion die so that they would disposed within the flange portions of the extruded duct. The grouping of transmission media (e.g. two single twisted insulated copper wires and 12 900 μm tight buffered optical fibers) were fed through the die such that they would be disposed within the bore of the conduit portion of the duct. The FRP strength member rods were used as provided although applying a surface treatment such as roughening the surface of the rods with an abrasive may enhance the adhesion between the FRP strength member rods and the resin material.

Figure 7:
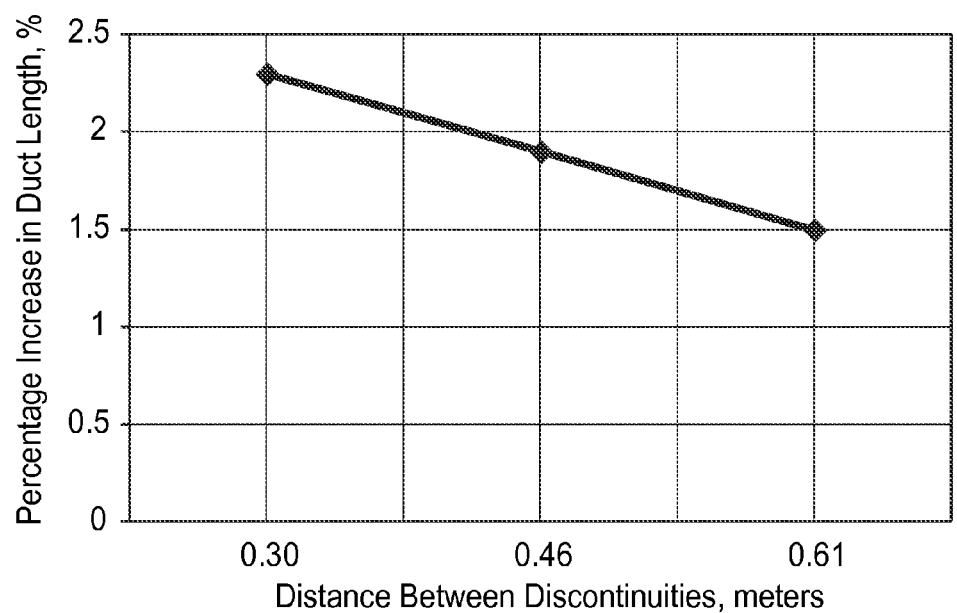
FIGS. 7 is a graph showing the effect on elongation based on the distance between strength member discontinuities in exemplary ductwork according to an aspect of the present invention.

The final duct having discontinuous strength members was formed from the extruded duct by slitting or notching the flanges of the extruded duct to create discontinuities between aligned strength member segments at regular intervals along the length of the duct as represented by FIG. 3A, which was described previously. The width of the discontinuities as well as the distance between adjacent discontinuities determines the segmental elongation of the exemplary duct. This is illustrated in part by FIG. 7. FIG. 7 shows how the elongation due to installing the duct onto a mounting surface can be controlled by altering the distance between the discontinuities between aligned segments. In particular the graph shows that the elongation of the exemplary duct with discontinuous strength members decreases as the distance between the discontinuities increases. In an exemplary aspect of the invention, the exemplary ducts will have an overall elongation less than 3%, preferably less than 2%.

In another exemplary aspect, a controlled elongation duct can be formed by feeding individual segments into an extruder such that they will be disposed in a sequentially aligned configuration. In this aspect there is no need to utilize a post-processing step to introduce the discontinuities by slits or notching the flanges of the duct. FIGS. 4A and 4B show a schematic representation of duct 200 formed by this method. Duct 200 is an elongated structure, as described previously, that includes a main body 210 having a conduit portion 212 with a bore or cavity 214 provided therethrough and can accommodate transmission media to provide horizontal cabling for IBW applications or optical fibers to support a fiber to the home network. The cavity extends longitudinally through the main body and defines the longitudinal axis of the exemplary duct. The cavity is sized to accommodate transmission media (not shown) in the form of one or more communications lines and/or power conductors disposed therein. The transmission media can be communication lines that can be pre-populated within the cavity of the duct prior to installation of the duct onto a mounting surface.

Duct 200 also includes two discontinuous strength members 230 disposed within flange portions 215*a*, 215*b* which also provide support for the duct as it is installed on or mounted to a wall or other mounting surface, such as a floor, ceiling, or molding. Each of the discontinuous strength members is made up of a plurality of aligned segments that lie parallel to the longitudinal axis of the duct such that there is a discontinuity 240 between adjacent segments 230*a*, 230*b* of the strength member 230. In an exemplary aspect, the head end of one of the aligned segments is disposed adjacent or proximate to the tail end of another segment. Thus, the aligned segments can be disposed in a head-to-tail arrangement forming the discontinuous strength member. In an exemplary aspect, the discontinuity between adjacent segments of the at least one strength member can be disposed at regular intervals along the length of the exemplary duct. In an exemplary duct having more than one strength member, the discontinuities between adjacent segments can occur at the same position along the longitudinal length of the duct. The width of the discontinuities as well as the distance between adjacent discontinuities determines the segmental elongation of the exemplary duct.

Providing discontinuities between adjacent segments in the strength members embedded in the duct can create non-elongation zones 260 and elongation zones 262. The non-elongation zones can be defined as the regions of the duct having the continuous segments of the strength members and the elongation zones can be defined as the regions in the duct that are proximate to the discontinuities between adjacent segments of the strength member as shown in FIG. 4A and 4B. FIG. 4A shows a portion of duct 200 in a non-elongated state while FIG. 4B shows a top view of a portion of duct 200 that has been subjected to a longitudinal extension force (as indicated by extension force arrow $F_e$ in the figure) causing a lengthening of the elongation zone 262. The ends of adjacent segments 230a, 230b of the strength member 230 slide away from each other when the duct is stretched forming a void or hollow channel 244 between the ends of adjacent segments.

Figure 5:
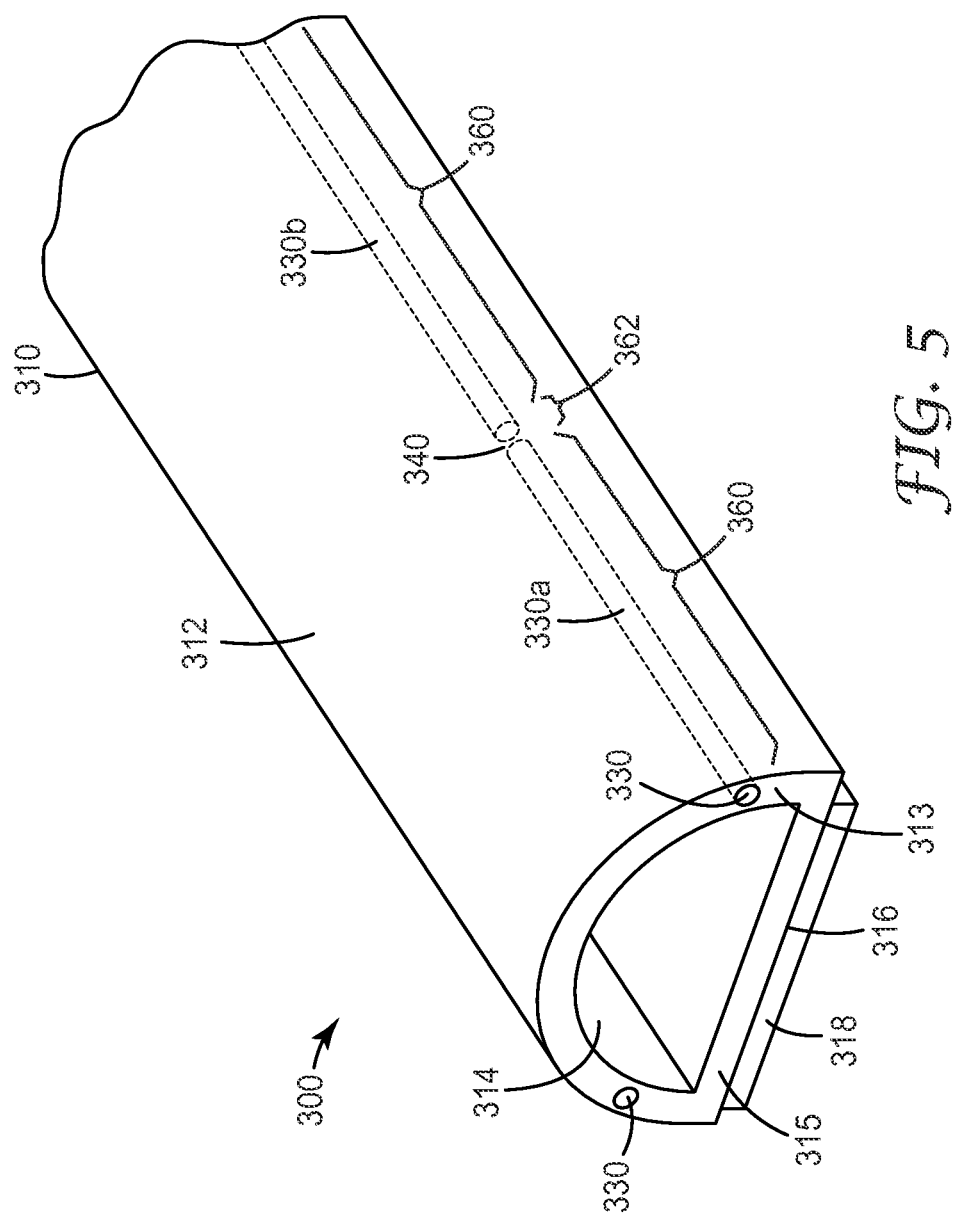
FIG. 5 is an isometric view of a third exemplary adhesive-backed duct in accordance with an aspect of the present invention.

Referring to FIG. 5, Duct 300 is an elongated structure having a D-shaped cross section. The duct includes a main body 310 having a conduit portion 312 having a flat bottom 315. The conduit portion can have a bore or cavity 314 provided therethrough to accommodate transmission media. The cavity extends longitudinally through the main body and defines the longitudinal axis of the exemplary duct. The cavity is sized to accommodate transmission media (not shown) in the form of one or more communications lines and/or power conductors disposed therein. The transmission media can be communication lines that can be pre-populated within the cavity of the duct prior to installation of the duct onto a mounting surface. An adhesive layer 318 can be disposed on the lower surface 316 of the flat bottom that can be used to attach the exemplary duct to a mounting surface.

Duct 300 also includes two discontinuous strength members 330 disposed within the arced side wall 313 of conduit portion 312. Each of the discontinuous strength members is made up of a plurality of aligned segments 330a, 330b that lie parallel to the longitudinal axis of the duct such that there is a discontinuity 340 between adjacent segments 330a, 330b of the strength member 330. In an exemplary aspect, the head end of one of the aligned segments is disposed adjacent or proximate to the tail end of another segment. In an exemplary aspect, the discontinuity between adjacent segments of the at least one strength member can be disposed at regular intervals along the length of the exemplary duct. In an exemplary duct having more than one strength member, the discontinuities between adjacent segments can occur at the same position along the longitudinal length of the duct. The width of the discontinuities as well as the distance between adjacent discontinuities determines the segmental elongation of the exemplary duct.

Providing discontinuities between adjacent segments in the strength members embedded in the conduit portion 312 of duct 300 can create non-elongation zones 360 and elongation zones 362. The non-elongation zones can be defined as the regions of the duct having the continuous segments of the strength members and the elongation zones can be defined as the regions in the duct that are proximate to the discontinuities between adjacent segments of the strength member. When an elongation force is applied to the duct, the elongation zone is lengthened forming a void or hollow channel between the ends of adjacent segments as described previously with respect to FIG. 4B.

Figure 6A:
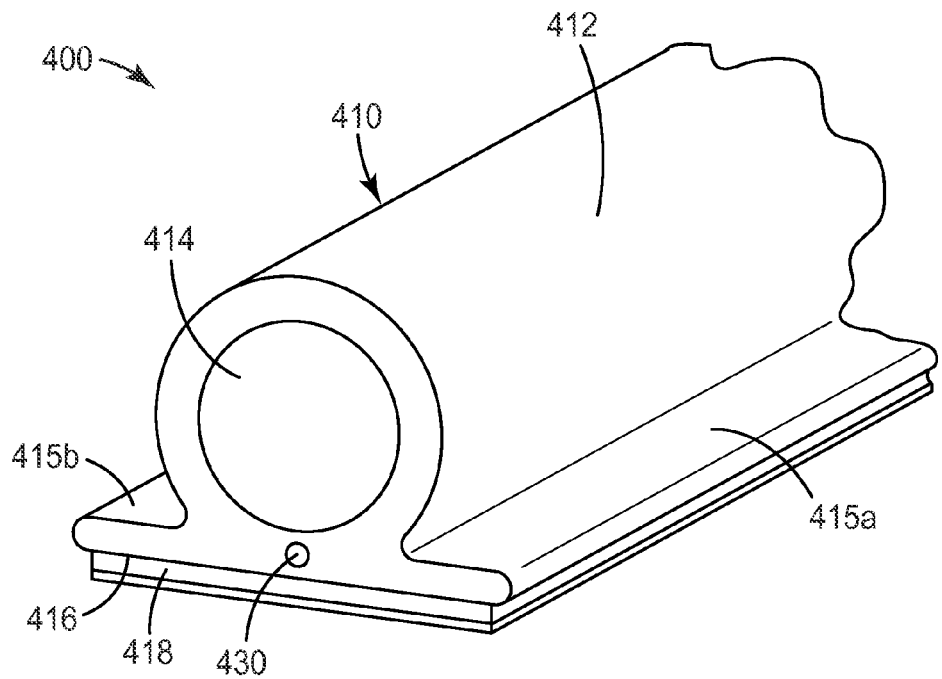
FIGS. 6A-6C are three views of a forth exemplary adhesive-backed duct in accordance with an aspect of the present invention.
Figure 6B:
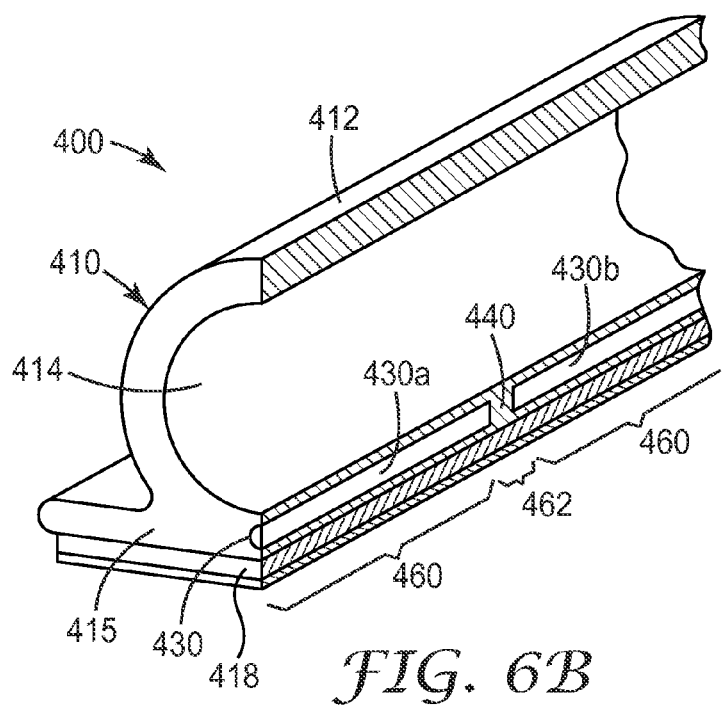
Figure 6C:
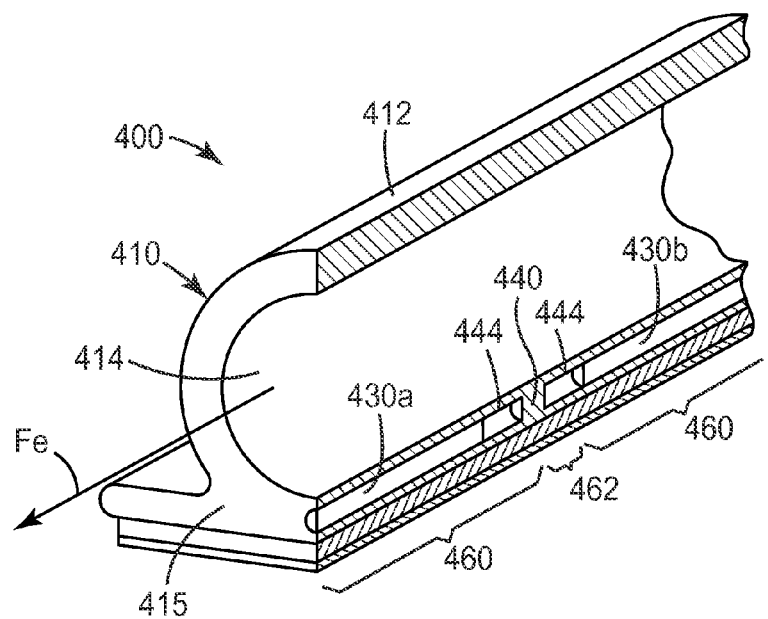

Referring to FIGS. 6A-6C, Duct 400 is an elongated structure having a omega (Ω) shaped cross section similar to the ducts 100, 200 shown in FIGS. 3A and 4A, respectively. However, duct 400 differs from the earlier embodiment in that is has a single discontinuous strength member centrally disposed beneath the conduit portion of the duct rather than being located within flange portions of the duct. Specifically, duct 400 includes a main body 410 having a conduit portion 412 and flange portions 415a, 415b extending from either side of the conduit portion. Flange portions 415a, 415b when considered together can be referred to collectively as flange 415. Flange 415 is characterized as having a flat bottom surface 416. An adhesive layer 418 can be laminated to this surface to allow installation of the duct onto a mounting surface such as a wall, ceiling, partition or divider.

The conduit portion 412 can have a bore or cavity 414 provided therethrough to accommodate transmission media. The cavity extends longitudinally through the main body and defines the longitudinal axis of the exemplary duct. The cavity is sized to accommodate transmission media (not shown) in the form of one or more communications lines and/or power conductors disposed therein. The transmission media can be communication lines that can be pre-populated within the cavity of the duct prior to installation of the duct onto a mounting surface.

Discontinuous strength member 430 is embedded within the flange 415 of main body 410 such that it is centrally disposed beneath bore 414 of conduit portion 412. Embedding the discontinuous strength member under the conduit portion rather than in the flange portions can allow for smaller flange portions which may improve the aesthetics of the duct. Each of the discontinuous strength member is made up of a plurality of aligned segments 430a, 430b that lie parallel to the longitudinal axis of the duct such that there is a discontinuity 440 between adjacent segments 430a, 430b of the strength member 430. In an exemplary aspect, the head end of one of the aligned segments is disposed adjacent or proximate to the tail end of another segment. In an exemplary aspect, the discontinuity between adjacent segments of the discontinuous strength member can be disposed at regular intervals along the length of the exemplary duct. The width of the discontinuities as well as the distance between adjacent discontinuities determines the segmental elongation of the exemplary duct.

Providing discontinuities between adjacent aligned segments 430a, 430b in strength member 430 embedded beneath the conduit portion 412 of duct 400 can create non-elongation zones 460 and elongation zones 462. The non-elongation zones can be defined as the regions of the duct having the continuous segments of the strength member and the elongation zones can be defined as the regions in the duct that are proximate to the discontinuities between adjacent segments of the strength member. When an elongation force, $F_e$, is applied to duct 400 as shown in FIG. 6C, the elongation zone is lengthened which can allow a void(s) or hollow channel(s) 444 to form between the ends of adjacent segments as described previously with respect to FIG. 4B.

While the ducts described herein have a general omega (Ω) or D-shape, the duct designs can be modified to have an another symmetric geometric shape (for example, a generally rectangular shape or a D-shape) or can have asymmetric shape (such as a flange wider on one side than the other, or having a single flange, such as in a P-shaped duct), as would be apparent to one of ordinary skill in the art given the present description.

The exemplary ducts of the present invention formed from a polymeric resin material, such as a polyolefin, a polyurethane, a polyvinyl chloride (PVC), or the like. For example, in one aspect, the ducts can comprise an exemplary material such as a polyurethane elastomer, e.g., Elastollan 1185A10FHF available from BASF Corporation (Florham Park, N.J.). In another aspect, the exemplary ducts can comprise an exemplary material such as an elastomeric PVC resin such as an APEX flexible extrusion grade PVC resin available from Teknor Apex Company (Jamestown, N.C.) or a PolyOne GEON™ Vinyl Wire & Cable JLK51L Polyvinyl Chloride, Flexible (PVC, Flexible) available from PolyOne Corporation (Avon Lake, Ohio). Additives, such as flame retardants, stabilizers, and fillers can also be incorporated as required for a particular application. In a preferred aspect, the ducts are flexible, so that it can be guided and bent around curved surfaces, corners and other structures without cracking or splitting.

The exemplary ducts having discontinuous strength members can be formed by first forming an extruded duct having continuous longitudinal strength members embedded within the resin material used to form the main body followed by a supplemental process to form the discontinuities between the aligned segments. A slitting/notching process that cuts through the continuous strength members at regular intervals along the length of the duct can be used to form the discontinuities between the aligned strength member segments forming one embodiment of the exemplary duct of the present invention. Alternatively, discrete segments of a rod-like strength member can be fed into the extruder while the duct is being formed. This second method eliminates the need for the port production slitting/notching process.

Figure 8:
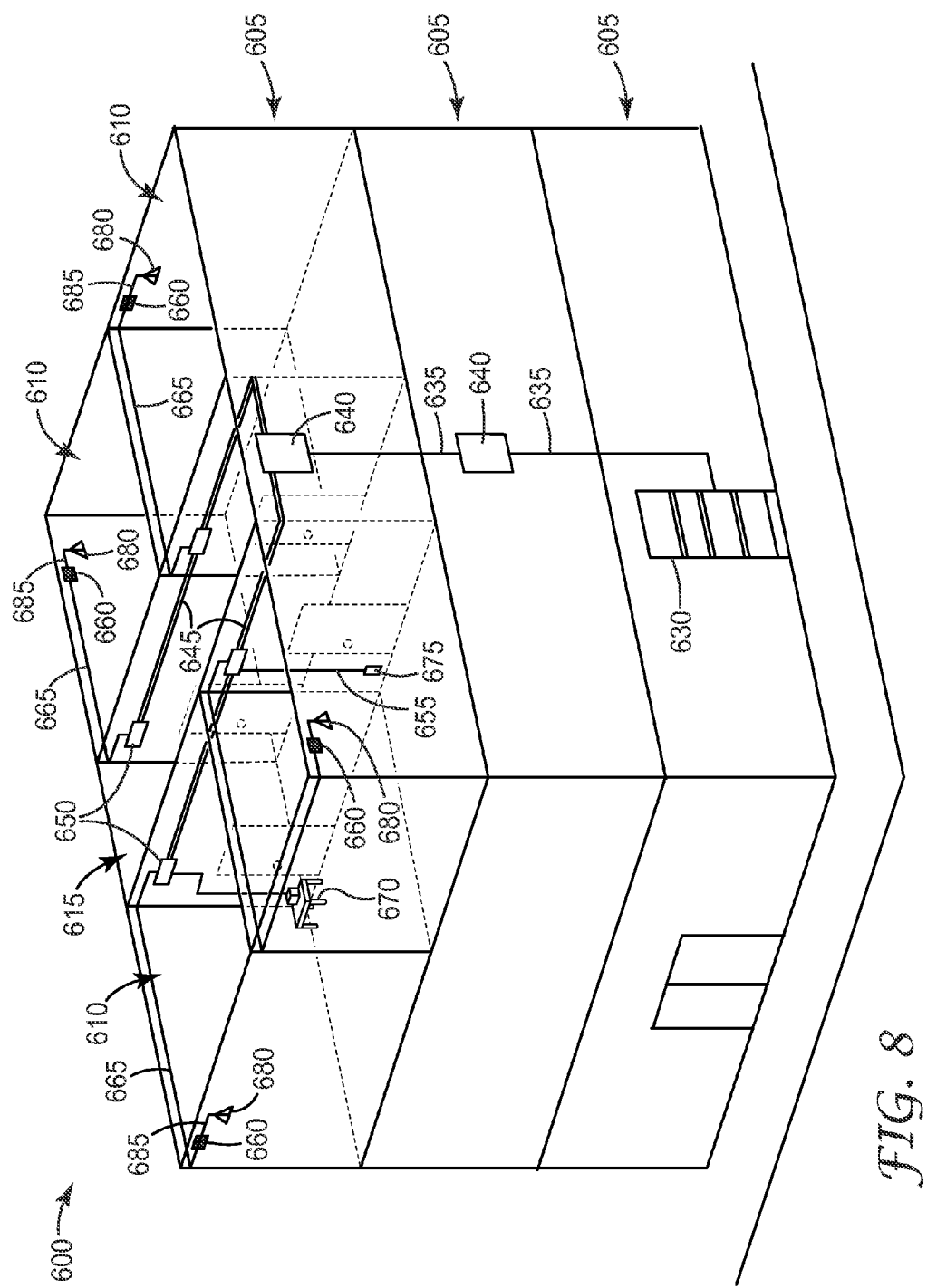
FIG. 8 is a schematic view of an exemplary MDU having internal communication network utilizing the exemplary duct according to another aspect of the present invention.

Variations of the exemplary adhesive-backed duct, described herein, can be used as part of a passive optical local area network (not shown) or a converged in-building wired and wireless system as shown in FIG. 8. In this system, the adhesive-backed duct can be used as a horizontal cabling duct or structure 645 between area junction boxes or distribution boxes located on each floor and the point of entry boxes located at one or more access points 650, such as at or near the entryway of a living unit. Additionally, the adhesive-backed ducts of the current disclosure can be used as a wireless cabling duct or structure 665 to carry single or multiple optical fiber with or without plus power cables within each living unit from the point of entry box to a remote radio socket located near each of the distributed antennas. Finally, the exemplary duct can be used as a RF signal media carrier 685, such as a coaxial conductor, from a remote radio to a distributed antenna.

For example, FIG. 8 shows an exemplary multi-dwelling unit (MDU) 600 having three floors 605 and four living units 610 on each floor. Each floor has a central hallway 615 and two living units located on either side of a central hallway.

A feeder cable (not shown) brings wired communications lines to and from building 600 from the traditional communication network and coax feeds bring the RF or wireless signals into the building from nearby wireless towers or base stations. All of the incoming lines (e.g. optical fiber, coax, and traditional copper) are fed into a main distribution facility in the basement or equipment closet of the MDU, which is used to organize the signals coming into the building from external networks to the centralized active chassis equipment for the system. Power mains and backup power is typically configured in this main distribution facility. Additionally, fiber and power cable management which supports the indoor wired and wireless networks both into the building from the outside plant and onto the rest of the indoor network distribution system can be located in the main distribution facility. The main distribution facility can include one or more racks 630 to hold equipment chassis as well as telecommunication cable management modules. Exemplary equipment which can be located on the rack in the main distribution facility can include, for example, a plurality of RF signal sources, an RF conditioning drawer, a DAS hub, a power distribution equipment, and DAS remote management equipment. Exemplary telecommunication cable management modules can include, for example, a fiber distribution hub, a fiber distribution terminal or a patch panel.

Riser cables or trunk cables 635 run from the equipment rack 630 in the main distribution facility to the area junction boxes 640 located on each floor 605 of the MDU 600. The area junction box provides the capability to aggregate horizontal fiber runs and optional power cabling on each floor. At the area junction box, trunk cabling can be broken out into a number of inventive ducts containing one or more types of signal carrying media, such as optical fibers, copper communication cables and/or power cables. As mentioned previously, the exemplary duct, such as duct 100 shown in FIG. 3A, that has been pre-populated with the desired signal media can act as horizontal cabling 645 within the MDU carrying the wired and wireless signals through a variety of interface boxes such as a point of entry box, an access box or an additional distribution box to the antennas. A point of entry box 650 can be located at each living unit to split off power and communication cables to be used within a given living unit 610.

These cables or signal media can feed remote radio sockets 660, communication equipment 670 inside of each living unit or can lead straight to a wall receptacle 675 to which a piece of communication equipment can be connected by a patchcord (not shown). Exemplary communication equipment can include a single family unit optical network terminal (SFU ONT), desktop ONT, or similar device (e.g., a 7342 Indoor Optical Terminal, available from Alcatel-Lucent or a Motorola ONT1120GE Desktop ONT).

The optical fibers and power cables contained within an exemplary horizontal cabling duct structure can feed the remote radio socket through a second smaller (i.e. lower cable count) wireless cabling duct 655. The remote radio socket can include remote repeater/radio electronics to facilitate a common interface between the active electronics and the structured cabling system. The remote radio socket facilitates plugging in the remote radio electronics which convert the optical RF to electrical signals and further distributes this to the distributed antennas 680 for radiation of the analog RF electrical signal for the in building wireless distribution system. The distributed antennas 680 can be connected to the remote radio socket 660 by a short length of RF signal carrier 685.

In addition, Optical drop fibers can be carried from the point of entry box 650 to an anchor point, such as wall receptacle 675 or a piece of communication equipment 670, via low profile duct 655 capable of carrying one to four individual optical fibers. In a preferred aspect, the duct 655 can be disposed along a wall, ceiling, under carpet, floor, or interior corner of the living unit in an unobtrusive manner, such that the aesthetics of the living unit are minimally impacted.

The cabling system described above can be used with RoF DAS, split radio, software defined radio, pico cell, and femto cell in-building wireless networks. In particular, the cabling system can use the inventive adhesive-backed duct in a distributed antenna system that can be mounted to a vertical mounting surface such as a wall or a horizontal mounting surface such as a ceiling via the optional adhesive backing layer or can be installed above the ceiling without the additional adhesive backing layer. In an exemplary installation, the adhesive-backed duct can be mounted to the wall of the building just below the ceiling.

In one exemplary use, the cabling ducts, described herein, can be used as part of a passive copper coax distribution architecture. In this architecture, the adhesive-backed duct can be filled with coax cables (e.g. standard coax cables, micro-coax cables or twinax coax cables) with only a head-end active component. The cabling ducts can provide the communication conduit between the active head end component and the antennas distributed throughout the building. Thus, this system can be implemented to connect the discrete distributed antennas to the horizontal coax channels with conventional splitters, taps, and/or couplers. In this manner, multiple service carriers can utilize the adhesive-backed duct as horizontal cabling. This type of architecture can work with many different RF protocols (e.g., any cellular service, iDEN, Ev-DO, GSM, UMTS, CDMA, and others).

In one alternative aspect, the exemplary adhesive-backed duct can include multiple coax cables. For example, separate coax conductors can connect to separate antennas of a multiple-input and multiple-output (MIMO) antenna system, e.g., a 2×2 MIMO antenna system, a 4×4 MIMO antenna system, etc. In another alternative aspect, first and second coax conductors can be coupled to a single antenna system with cross-polarized antenna elements.

In another example, the exemplary cabling duct can be used as part of an active analog distribution architecture. In this type of architecture, RF signal distribution can be made over coax or fiber (RoF). In this architecture, the adhesive-backed duct can be combined with selected active components, where the types of active components (e.g., O/E converters for RoF, MMIC amplifiers) are selected based on the specific architecture type. This type of architecture can provide for longer propagation distances within the building and can work with many different RF protocols (e.g., any cellular service, iDEN, Ev-DO, GSM, UMTS, CDMA, and others).

The exemplary cabling duct described above can be used in buildings where there are a lack of established horizontal pathways from main distribution boxes to distributed antennas or end user dwellings. For buildings with drywall ceilings and few or no access panels, the adhesive-backed ducts of the present invention can be installed without having to enter the existing drywall ceiling by attaching it to an exposed surface of a wall or ceiling in an inconspicuous manner. For installations in older buildings in which the blueprints are missing or inaccurate, the adhesive-backed ducts can be installed on the basis of a visual survey. Additionally, the exemplary adhesive-backed ducts, described herein, can minimize or eliminate the need to disturb existing elaborate trim and hallway decorum. In addition, the need to establish major construction areas can be avoided.

The adhesive-backed ducts can provide for routing signals to different locations within a building, such as "lunch room," "conference room," "meeting room", etc. The mix and match cable options allows for use in many different types of installations using similar installation protocols for installing the exemplary duct.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A adhesive-backed duct, comprising:
a continuous main body having a conduit portion with a cavity formed longitudinally therethrough;
a flange portion having an adhesive layer to mount the duct to a mounting surface; and at least one rod-like strength member disposed within and extending longitudinally with the main body of the duct, wherein the at least one rod-like strength member is comprised of a plurality of aligned segments wherein the at least one rod-like strength member has a discontinuity between adjacent aligned segments at regular intervals disposed longitudinally along the continuous main body.

2. The duct of claim 1, wherein the aligned segments and the discontinuities between adjacent aligned segments of the rod-like strength members create non-elongation zones and elongation zones within the duct.

3. The duct of claim 2, wherein the non-elongation zones are defined as regions of the duct having the aligned segments of the rod-like strength members and the elongation zones can be defined as regions in the duct that are proximate to the discontinuities between adjacent segments of the strength member.

4. The duct of claim 1, wherein the adhesive layer is disposed on a bottom side of the flange.

5. The duct of claim 1, wherein the duct is formed from a flexible material so that it can be guided and bent around corners and other structures.

6. The duct of claim 1, further comprising a plurality of communication lines disposed within cavity formed longitudinally within the conduit portion of the duct.

7. The duct of claim 1, further comprising a power line disposed within cavity formed longitudinally within the conduit portion of the duct.

8. The duct of claim 7, wherein the at least one communication line is one of a coaxial cable, a twisted pair copper wire or an optical fiber.

9. The duct of claim 1, wherein the duct includes two rod-like strength members disposed embedded within the main body of the duct.

10. The duct of claim 9, wherein the flange includes two flange portions and wherein one of the two rod-like strength members is disposed in one of the two flange portions.

11. The duct of claim 9, wherein the flange includes two flange portions having a plurality of slits extending through a section the flange portions that includes the two rod-like strength members such that the rod-like strength members are cut creating the plurality of aligned segments.

12. The duct of claim 9, wherein two rod-like strength members disposed within a side wall of the conduit portion.

13. The duct of claim 1, wherein the duct includes one rod-like strength member disposed embedded within the main body beneath the conduit portion of the duct.

14. The duct of claim 1, wherein the at least one rod-like strength member is characterized by a cross-sectional diameter between 0.25 mm and about 1.0 mm.

15. The duct of claim 14, wherein the duct is made of a flexible resin material and wherein the thickness of the resin material surrounding the rod-like strength member is greater than or equal to the equivalent to the cross-sectional diameter of the rod-like strength member.

* * * * *